April 22, 1969 W. C. BROEKHUYSEN 3,440,357

AUTOMATIC DIALING APPARATUS

Original Filed April 14, 1965

INVENTOR.
WILLIAM C. BROEKHUYSEN

BY [signature]

ATTORNEY

INVENTOR
WILLIAM C. BROEKHUYSEN
BY [signature]
ATTORNEY

United States Patent Office 3,440,357
Patented Apr. 22, 1969

3,440,357
AUTOMATIC DIALING APPARATUS

William C. Broekhuysen, New York, N.Y., assignor to G-V Controls Inc., Livingston, N.J., a corporation of New Jersey Continuation of application Ser. No. 448,093, Apr. 14, 1965. This application June 10, 1968, Ser. No. 739,896
Int. Cl. H04m 1/26
U.S. Cl. 179—90 7 Claims

ABSTRACT OF THE DISCLOSURE

A plurality of digit conductors (*d* in number) and a plurality of address conductors (*c* in number) control an array of *cd* transistors, each combination of one digit conductor and one address conductor when contemporaneously activated rendering conductive a respective one of those transistors. As an incident to activation of an address conductor the digit conductors are successively activated thereby successively to render conductive *d* of the transistors. A plurality of local circuits are respectively connected with the terminals of an electrical system which transmits integer-representing signals as determined by the terminal interconnection, and each circuit has associated therewith a respective control means, to which the collector of one of the transistors may be connected, for closing that circuit when that transistor is conductive. Means are interposed between the collectors and the control means for establishing preselected connections therebetween.

This application is a continuation of my similarly entitled application Ser. No. 448,093, filed Apr. 14, 1965, which is being abandoned upon the filing of this application.

This invention relates to automatic dialing apparatus, and more particularly to dialing apparatus by which a multi-digit telephone address may be dialed in response to the manipulation of a single control—e.g. the depression of a single button. The term "telephone address" is used herein to denote what is commonly referred to as "telephone number," in order to avoid confusion with the use herein of the word "number" in its elementary sense. The term "dialing" is used in the broad sense of commanding a connection with the telephone at a particular telephone address, without limitation to the specific sense of manipulating a dial as such.

There is in use manual dialing apparatus provided with a bank of integer-representing buttons, typically ten in number, with which a multi-digit telephone address may be dialed by successive depression of the buttons respectively corresponding to the successive integers of that address—e.g., if that address be 112–3580, by successive depression of the buttons labelled "1," "1," "2," "3," "5," "8," and "0." Such apparatus is of a variety of types; in general, however, each of those types involves the use of an electrical system, for the selective transmission of a number of respective-integer-representing signals, which includes a number *s* (*s* being at least one) of sets of variously interconnectible terminals, it being the particular interconnection of those terminals existing at any time which determines the integer which will at that time be represented by the signal transmitted from that electrical system.

The procedure of successive depression of *d* buttons (*d* being the number of digits to be dialed—in the example just given, seven), obviously affords the opportunity to dial any desired telephone address whatever of *d* digits. It does, however, impose on the user a burden which is far greater and which, except in the hands of a telephone operator or other person who by constant dialing develops unusual proficiency, is far slower and more prone to error, than that which would be imposed by a need to depress only one button for a given telephone address. There are many specialized commercial or professional situations in which the vast majority of calls are made to a limited number only of telephone addresses, or in which (e.g. in a 2- or even a 3-digit PBX or other intercommunication system) the total number of telephone addresses to be dealt with is finite. In either of these situations the overall burden on the user may be greatly reduced, speed greatly increased and propensity to error minimized, by the use of automatic apparatus which causes the successive dialing of all *d* digits of a telephone address in response to the depression of a single button (or the like) appropriate to that address—such apparatus being permissibly supplemented by the manual apparatus above described, so that any telephone address not provided for by a respective single button may still be dialed manually. It is to the provision of such automatic apparatus that this invention is particularly directed.

While not in all aspects limited thereto, the invention has especial utility and has been employed with great success in connection with an electrical system (such as is now available to telephone subscribers in certain communities) in the form of a tone-dialing oscillator, in particular one which is arranged to transmit a dual-frequency tone and in which the terminals abovementioned are arranged in two sets, the interconnections of the terminals of each set determining a respective one of the two frequencies of that tone.

The invention among other things comprises an improvement over the apparatus disclosed in the co-pending application of Walter Pecota, Ser. No. 414,496, filed Nov. 18, 1964.

In one aspect the invention comprises, in combination with an electrical system such as above described, *d* (*d* being a plural integer) digit conductors; *c* (*c* being a plural integer) selectively activatable address conductors; *cd* transistors each having a collector and a pair of control contacts consisting of base and emitter, those contacts of one type being connected with the digit conductors and those contacts of the other type being connected with the address conductors in matrix arrangement such that each combination of one digit conductor and one address conductor when contemporaneously activated renders conductive a respective one of the transistors; means, actuated as an incident to the activation of one of the address conductors, for successively activating the digit conductors in a predetermined sequence thereby successively to render conductive *d* of the transistors; a plurality of normally open local circuits connected with the terminals of the initially mentioned electrical system, each of those circuits having associated therewith a respective control means, to which the collector of one of the transistors may be connected, for closing that circuit when that transistor is conductive thereby to effect a respective interconnection among those terminals; and means electrically interposed between the collectors of the transistors on the one hand and the control means on the other for establishing preselected connections of the collectors to the control means.

When the number of *s* of sets of the terminals abovementioned is greater than one, the invention in one aspect contemplates that the connection-establishing means will provide for the establishment of connections from each collector to *s* of the control means; such connections may include decoupling diodes.

It is frequently desirable, especially when the function of the interconnections of the set terminals is the tuning of an audio-frequency oscillator, that those interconnections be short and of low impedance. This is provided for by the local-circuit arrangements mentioned in the second preceding paragraph, a specific embodiment of which involves preselected connections of the transistor collectors to the coils of a plurality of electromagnetic relay means which in turn have respective contacts predeterminedly connected with the set terminals.

In the means which activate the address conductors it is convenient to use triggerable silicon controlled devices (typically SCS's). Difficulty is sometimes encountered in the form of unwanted triggering of these devices by transients either in the power supply or on the conductors leading to the switches by which the devices are intentionally to be triggered. The invention in one aspect comprises the use of inductive means to delay the build-up in each of the triggerable silicon controlled devices of anode current in response to a transient which is sufficient to trigger that device, so that that current does not rise to hold-in value until after the triggering transient has ceased.

Various objects of the invention have been made apparent by the foregoing brief description. Allied and other objects will be apparent from the detailed description hereinafter set forth and from the appended claims.

In that detailed description reference is had to the accompanying drawings, in which:

FIGURE 3 is a schematic diagram of a typical tone-dialing oscillator which may form the electrical system above referred to.

Figure 1:
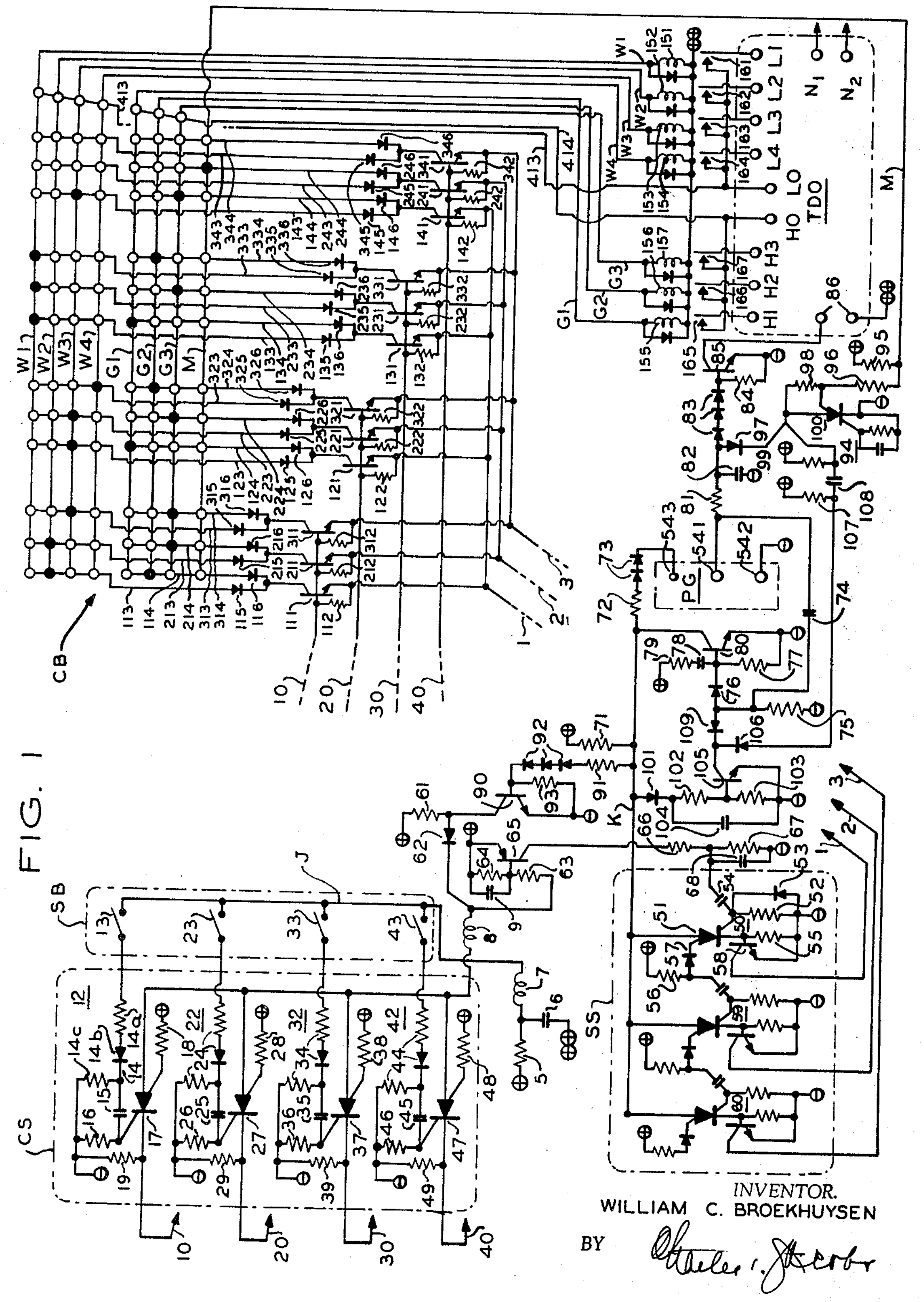
FIGURE 1 is a schematic diagram of one embodiment of an automatic dialing apparatus according to the invention, the electrical system whose terminals are to be variously interconnected and the pulse generator each being indicated by a respective box.
Figure 3:
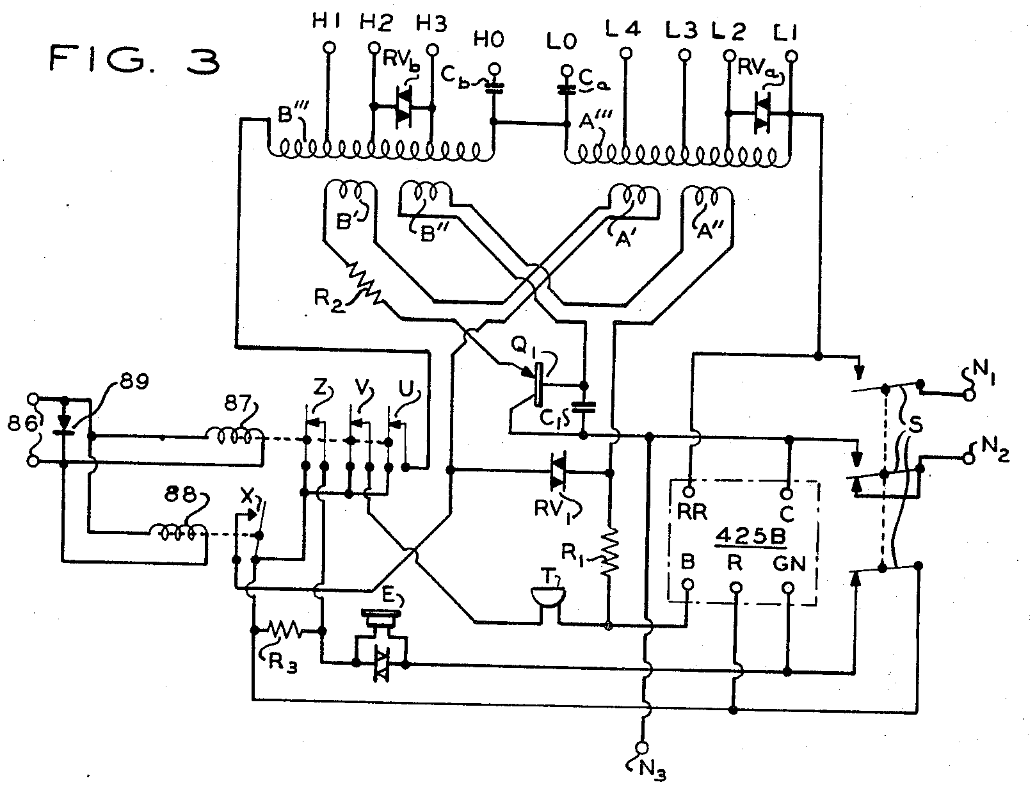

Since in the embodiment of FIGURE 1 the electrical system above referred to is a tone-dialing audio-frequency oscillator, such an oscillator may first be briefly described. In principle such an oscillator could generate ten different single-frequency tone outputs, then being provided for example with a single set of variously interconnectible terminals whose interconnections would determine the oscillator's tone output. In practice it has been found by others that a preferable approach is to cause the oscillator to generate dual-frequency tone outputs, the oscillator then being typically provided with two sets of variously interconnectible terminals—the interconnections of the terminals of the first set determining the lower-frequency component, and the interconnections of those of the second set determining the higher-frequency component, of the tone output. A typical design of such an oscillator has been detailedly described in an article by J. H. Ham and F. West of Bell Telephone Laboratories, Inc. presented at the A.I.E.E. Winter General Meeting of January–February 1962 as Paper No. 62–227. In FIGURE 3 of the drawings I show an oscillator of design essentially similar to that of FIGURE 3 of that article, integrated with the transmitter T and the receiver or earphone E of a standard telephone set.

It will be understood that if $s$ be the number of sets of variously interconnectible terminals, then $s$ in the tone-dialing oscillator illustrated in FIGURE 3 will be two.

Briefly, the positive and negative conductors of the telephone line are connected to respective terminals $N_1$ and $N_2$ and, when the cradle switch S is closed, to respective terminals RR and C on the conventional network 425B, under which circumstances the network terminal B will inter alia be somewhat more positive than $N_2$ and the network terminal R will inter alia be still more positive. A p-n-p transistor $Q_1$, whose collector is connected to the negative terminal C, is the amplifying element of the oscillator. The requisite feedback is provided by two ferrite-core transformers whose primaries $b'$ and $A'$ and a resistor $R_2$ are serially connected between the emitter of $Q_1$ and the network terminal R, and whose secondaries $B''$ and $A''$ and a resistor $R_1$ are serially connected between the base of $Q_1$ and the network B. A capacitor $C_1$ is connected between the base and the collector of $Q_1$, and a varistor $RV_1$ is connected between the primary and secondary returns (embracing $R_2$ but not $R_1$). The oscillator is of course intended to function only during the action of tone dialings; to place it otherwise out of operation the primary return is brought through a pair X of normally open contacts which will be closed only during each tone output.

The tuning of the lower-frequency component of the oscillator output is accomplished in the circuit of a tertiary winding $A'''$ provided on the first transformer, and that of the higher-frequency component in the circuit of a tertiary winding $B'''$ provided on the second transformer, these tertiaries being connected in series with each other. Each of the two tertiaries is provided with three taps, and in each instance the tuning is effected by connecting a capacitor between the junction of the tertiaries and a selected one of the taps or, in the case of the tertiary $A'''$, alternatively across the entire tertiary. A capacitor for tuning the tertiary $A'''$ is shown as Ca and one for tuning the tertiary $B'''$ as Cb. A first terminal of each is connected to the junction joining the two tertiaries; tuning of the lower-frequency component then requires simply the connection of the second terminal of Ca to one of the taps on $A'''$ or alternatively to its non-common extremity, while tuning of the higher-frequency component requires simply the connection of the second terminal of Cb to one of the taps on $B'''$.

The non-common extremity of $A'''$ may be connected to a terminal L1, the adjacent tap to a terminal L2, the next tap to a terminal L3 and the remaining tap to a terminal L4; the tap on $B'''$ nearest its non-common extremity may be connected to a terminal H1, the next tap to terminal H2 and the remaining tap to a terminal H3. To tune the lower-frequency component to its lowest frequency terminal L0 may be connected to terminal L1, to tune that component to the next higher frequency L0 may be connected to terminal L2, to tune to the next higher frequency L0 may be connected to terminal L3, and to tune the lower-frequency component to its highest frequency L0 may be connected to terminal L4; to tune the higher-frequency component to its lowest frequency H0 may be connected to terminal H1, to tune that component to its intermediate frequency H0 may be connected to terminal H2, and to tune that component to its highest frequency H0 may be connected to terminal H3. Thus L0 and L1 and L4 form one set of terminals to be variously interconnected, while H0 and H1 through H3 form a second set of terminals to be variously interconnected, to determine the oscillator's dual-frequency tone output.

As brought out in the article above referred to, the oscillation of the oscillator at two frequencies simultaneously is made possible by removing from the transistor $Q_1$ the task of amplitude limitation of the oscillations and thus permitting that transistor to operate over an essentially linear portion of its characteristic, and by otherwise and separately performing the amplitude-limiting task for each of the two frequency components. As in the disclosure of that article, amplitude limitation for the lower-frequency component may be effected by a varistor $RV_a$ shunted between the non-common extremity of tertiary $A'''$ and the adjacent one of the taps, and for the higher-frequency component may be effected by a varistor $RV_b$ shunted between the first and second taps of $B'''$ (reckoned from the common terminal).

In the normal use of the telephone the earphone E is to be connected directly across the network terminals R and GN, but during the operation of the oscillator it is desirable that this connection be through an attenuating resistor $R_3$; accordingly the connection of the earphone across the network terminals is made through $R_3$, but that resistor is normally shorted out by a pair Z of normally closed contacts which will be opened during operation of the oscillator. In the normal use of the telephone the transmitter T is connected directly across the network terminals R and B, but during the operation of the oscillator it is desirable that this connection be open-circuited; accordingly the connection of the transmitter across the network terminals is made through a pair V of normally closed contacts which will be opened during operation of the oscillator. In order to shock-excite each of the tuned circuits formed by the tertiaries A''' and B''' with the capacitors which will have been respectively shunted across selected portions of each (by interconnection of L0 with one of the terminals L1 through L4 and of H0 with one of the terminals H1 through H3), it is desirable that at the inception of a tone output there be interrupted a direct current otherwise flowing through those tertiaries; to provide for such a current the tertiaries may be serially connected between network terminals RR and R, and to provide for such interruption this connection may be made through a pair U of normally closed contacts which will be opened during operation of the oscillator.

As brought out in the references to which the article abovementioned refers, the frequencies made available for the lower-frequency component of the oscillator output may desirably be approximately 697, 770, 852 and 941 cycles per second, and those made available for the higher-frequency component may desirably be approximately 1,209, 1,336 and 1,477 cycles per second. As further there brought out, pairs of those frequencies may be used to signify various integers in accordance with the following:

| or the integer | Terminals connected to L0 and H0 | | Lower frequency | Higher frequency |
|---|---|---|---|---|
| 1 | L1 | H1 | 697 | 1, 209 |
| 2 | L1 | H2 | 697 | 1, 336 |
| 3 | L1 | H3 | 697 | 1, 477 |
| 4 | L2 | H1 | 770 | 1, 209 |
| 5 | L2 | H2 | 770 | 1, 336 |
| 6 | L2 | H3 | 770 | 1, 477 |
| 7 | L3 | H1 | 852 | 1, 209 |
| 8 | L3 | H2 | 852 | 1, 336 |
| 9 | L3 | H3 | 852 | 1, 477 |
| 0 | L4 | H2 | 941 | 1, 336 |

When the oscillator is performing its function of generating simultaneously oscillations of the two frequencies, its dual-frequency output appears across the terminals $N_1$ and $N_2$ and will be impressed across the telephone line connected to those terminals. If by the oscillator there be generated a series of dual-frequency tone outputs portraying a multi-digit number to be dialed, then through the intermediary of remote telephone-equipment circuitry itself known and forming no part of the present invention that number will be tone-dialed.

Except as specifically noted above, the foregoing description with respect to FIGURE 3 presents information contained in the article above referred to (to which reference may be had for further details) and is presented not to describe the present invention but rather to explain a typical environment with which it may be utilized.

Figure 2:
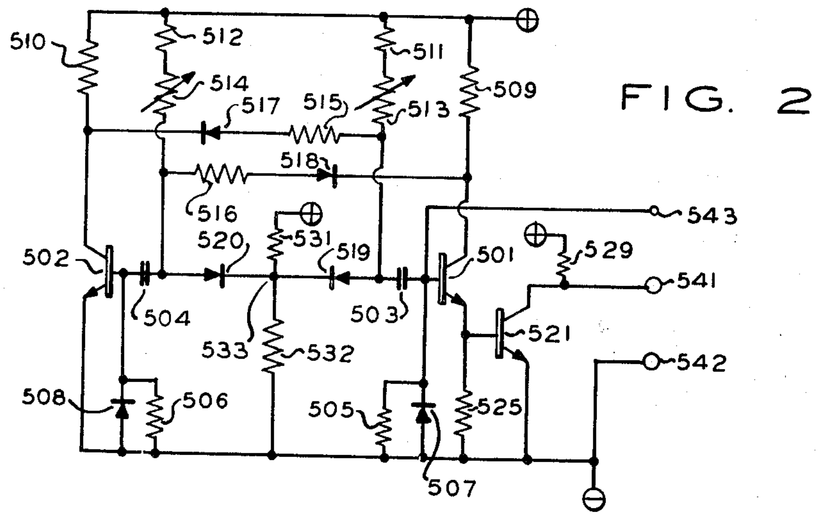
FIGURE 2 is a schematic diagram of a typical pulse generator such as referred to above.

A typical embodiment of my invention itself is illustrated in FIGURE 1, in combination with the above-described tone-dialing oscillator of FIGURE 3 (which in FIGURE 1 appears simply as a box designated TDO, with terminals designated and arranged similarly to those of FIGURE 3). In FIGURE 1 other circuit component—a pulse generator with one-stage amplifier—also is shown as a box, designated PG, and typical internal circuitry of that pulse generator is shown in FIGURE 2 hereinafter described. The apparatus of FIGURE 1 is intended to be powered by a D.C. supply (not shown) which provides an unregulated positive potential (typically 26 volts) and a lower regulated positive potential (typically 15 volts). For simplicity circuit points intended to be connected to the negative terminal of that supply are terminated in a single small circle containing a "—," circuit points intended to be connected to the regulated positive potential are terminated in a single small circle containing a "+," and circuit points intended to be connected to the unregulated positive potential are terminated in a pair of side-by-side small circles each containing a "+." Otherwise than as stated in this paragraph, FIGURE 1 is a complete schematic illustration in its own right.

While the invention may be arranged to tone-dial telephone addresses each of any number *d* of digits, FIGURE 1 for simplicity illustrates that number *d* as three. The invention makes use of a number *c* of address conductors each of which is normally utilizable for the tone-dialing of a respective preselected telephone address; FIGURE 1 arbitrarily illustrates the number *c* as four.

For the first digit, whatever the integer of which it in any particular telephone address may consist, there is provided a digit conductor 1, for the second digit there is provided a digit conductor 2, and for the third digit there is provied a digit conductor 3 (and more would be provided to increase the number of digit conductors to *d* if that were more than the illustrated three). For the tone-dialing of a first telephone address to be preselected there is provided an address conductor 10; for the tone-dialing of a second telephone address to be preselected there is provided an address conductor 20; for a third telephone address to be preselected, there is provided an address conductor 30; and for a fourth telephone address to be preselected there is provided an address conductor 40.

For each available combination of one digit conductor and one address conductor there may be provided a respective n-p-n transistor having a collector and a pair of control contacts comprising base and emitter. Thus for the combination of digit conductor 1 and address conductor 10 there is provided the transistor 111, for the combination of digit conductor 2 and address conductor 1 there is provided the transistor 211—and so on, the twelve (i.e. *cd*) transistors being provided in FIGURE 1 with respective numbers of which the first numeral is that of the respective digit conductor, the second numeral is the first numeral of the respective address conductor, and the third numeral is in each instance 1. Each transistor may have a relatively high-valued resistor connected between its control contacts, such resistor for each transistor being furnished in FIGURE 1 with a number higher by 1 than that of the respective transistor.

Each of the digit conductors 1, 2 and 3 is connected to one of the control contacts—specifically, to the emitter—of those transistors which are provided for the several combinations of it with the several channel conductors. Thus the digit conductor 1 is connected with the emitters of transistors 111, 121, 131 and 141; the digit conductor 2 is connected with the emitters of transistors 211, 221, 231 and 241; and the digit conductor 3 is connected with the emitters of transistors 311, 321, 331 and 341.

Each of the address conductors 10, 20, 30 and 40 is connected to the other of the control contacts—specifically, to the base—of those transistors which are provided for the several combinations of it with the several digit conductors. Thus address conductor 10 is connected with the bases of transistors 111, 211 and 311; address conductor 20 is connected with the bases of transistors 121, 221 and 321; address conductor 30 is connected with the bases of transistors 131, 231, and 331; and address conductor 40 is connected with the bases of transistors 141, 241 and 341. (The illustrated passage of each address conductor through, rather than merely to, two of the transistor bases to which it is connected has been resorted to merely in order to simplify the drawing.)

Each of the *cd* transistors is normally non-conductive, but is rendered conductive when there are contemporaneously activated the digit conductor which is connected to its emitter and the address conductor which is connected to its base.

Means are provided to activate a desired one of the *c* (e.g. four) address conductors 10, 20, 30 and 40. Such means may be comprised in an address selector schematically illustrated, under the designation CS, in FIGURE 1, in which there may be provided a conductor J to which there may be two paths from regulated positive potential—one through a relatively low-valued resistor 61 and a diode 62, the other through two serially arranged relatively high-valued resistors 64 and 63. For the illustrated four address conductors the address selector may comprise four selector units 12, 22, 32 and 42, of which selector unit 12 may first be described.

Through a switch 13 operable at will a network 14 may be connected between conductor J and negative supply potential; this network may for example comprise serially a resistor 14*a*, a diode 14*b* and a resistor 14*c*. Between conductor J and address conductor 10 there may be placed the anode-cathode path of a silicon controlled switch (that term being hereinafter abbreviated "SCS") 17. Between the junction of diode 14*b* with resistor 14*c* and the negative supply potential there may be serially connected a capacitor 15 and a resistor 16, and the cathode gate of SCS 17 may be connected to the junction joining 15 and 16; the anode gate of the SCS 17 may be connected to regulated positive supply potential through a resistor 18. A resistor 19 may be connected between address conductor 10 and negative supply potential.

In operation, if the switch 13 be momentarily closed a potential equal to regulated positive supply potential will be abruptly impressed across the network 14, and a substantial voltage will be abruptly developed across the resistor 14*c*. The wavefront incident to the latter will be impressed through capacitor 15 on the cathode gate of SCS 17; since the anode of that SCS is effectively connected to regulate positive supply potential at least through the resistors 63 and 64 that SCS is in condition to be fired, and it will be fired by this wavefront impression. The result of its firing will be the conduction of current through resistor 61 and diode 62 to conductor J and from that conductor through the SCS 17 and resistor 19 to negative supply potential, and the activation of address conductor 10 resulting from its being raised above negative supply potential by the voltage drop across resistor 19.

Each entirely similar to the selector unit 12 may be the selector units 22, 32 and 42—the designations of the components in each successive selector unit being progressively increased by 10. In each instance the included switch (13, 23, 33 or 43) constitutes a means connected with the respective address conductor and operable at will to activate that conductor.

In operation, once the SCS of any of the selector units 12, 22, 32 and 42 is fired and thus rendered conductive, and the associated address conductor activated, it will remain conductive until the performance of an act deliberately designed to terminate that conductivity; the performance of such an act at an appropriate time is contemplated, and it and the means for accomplishing it are hereinafter described.

Means are provided to cause the digit conductors, once conductor 1 has been activated, to be activated in the predetermined sequence which (including conductor 1) is 1, 2, 3. Such means may comprise a stepping switch (preferably electronic) of which a preferred form is schematically illustrated under the designation SS in FIGURE 1, and in which there may be provided a conductor K connected to regulated positive supply potential through a resistor 71. Such a stepping switch may comprise a number *d* of stages 50, 59 and 60, of which the first stage may first be described.

Between the conductor K and the negative supply potential there may be connected the anode-cathode path of an SCS 51 and a resistor 55. Between the cathode gate of the SCS 51 and that negative supply potential there may be connected a resistor 52 (across which a diode 53 may be shunted to preclude the development of excessive reverse potentials between cathode gate and cathode). An input capacitor 54 may lead to the cathode gate of 51 from other circuitry hereinafter to be described. From regulated positive supply potential to the anode gate there may be connected serially a resistor 56 and a diode 57. Across the resistor 55 there may be connected the base-to-emitter path of an n-p-n transistor 58 to whose collector there may be connected the digit conductor 1.

Each of the second and third stages of the stepping switch SS, designated respectively as 59 and 60, may be similar to the first stage as above described, excepting (i) that neither need contain a diode corresponding to 53 of the first stage, and (ii) the input capacitor of each of those stages is connected from the junction joining the resistor and the diode which lead to the anode gate of the preceding stage (e.g. the junction joining 56 and 57 in the first stage 50).

An adjunct of the stepping switch SS is a pulse generator (desirably with a one-stage amplifier); such a generator, designated at PG, is shown in FIGURE 1 simply as a box with two main output terminals 541 and 542, the latter being connected to negative supply potential, and with a third terminal 543 which, when there is applied to it a voltage substantially more positive than negative supply potential, quells or "squelches" the pulse generator. Typical internal circuitry of PG is shown in FIGURE 2 and is hereinafter detailedly described; it is sufficient at this juncture, however, to take note that while the pulse generator remains squelched the potential of the output terminal 541 will be substantially negative supply potential, that forthwith upon de-squelching that output-terminal potential will abruptly rise to many volts more positive than negative potential and will there remain for a first period typically of 50 milliseconds, that at the end of that period that output-terminal potential will abruptly drop back to substantially negative supply potential and will there remain for an interval typically of 50 milliseconds, that at the end of that interval that output-terminal potential will abruptly rise again—and so on in a series of 50-millisecond positive pulses separated by 50 millisecond intervals, until the pulse generator is re-squelched by the re-application to terminal 543 of a sustained voltage substantially more positive than negative supply potential.

The squelch terminal 543 may be connected to the conductor K mentioned above, through a resistor 72 and one or more diodes 73; so long as only infinite or high impedance intervenes between the conductor K and negative supply potential—which is the case in the quiescent condition of the apparatus—the conductor K will be at a potential close to regulated positive supply potential, and by the above-described connection of it to the terminal 543 there will then be applied to that terminal a squelching potential.

Between the output terminal 541 of the pulse generator and negative supply potential there may be serially connected a capacitor 74 and a resistor 75, and across the resistor 75 there may be serially connected a diode 76 and a resistor 77; across the resistor 77 there may be connected the base-to-emitter path of an n-p-n transistor 80 of which the collector is connected to the conductor K. The result of the circuitry described in this paragraph is that each time the terminal 541 abruptly rises in potential—i.e. at the beginning of each positive pulse from the pulse generator—the transistor 80 (i.e. its collector-to-emitted path) will be momentarily rendered conductive.

The application of a positive wavefront to the cathode gate of the SCS 51, through the input capacitor 54, will trigger the operation of the apparatus described in the last preceding six paragraphs, the initial result of that application being to fire SCS 51 so that current flows from conductor K to negative supply potential through that SCS and through the base-to-emitter path of transistor 58 (whose collector-to-emitter path is thus rendered conductive). This SCS firing reduces the potential of conductor K to little over a volt above negative supply potential, thus de-squelching the pulse generator to result forthwith in the first positive pulse at terminal 541. (Simultaneously with the onset of the first pulse there will tend to occur, as brought out in the last preceding paragraph, a momentary conductivity of the transistor 80 but this occurrence, in connection with the first pulse only, is foreclosed by means hereinafter described.)

The conductivity of SCS 51 and of transistor 58 will persist throughout the 50-millisecond first pulse and throughout the succeeding 50-millisecond inter-pulse interval. At the onset of the second pulse there will occur a momentary conductivity of transistor 80, which momentarily will divert sufficient current from SCS 51 so that the remnant current through the latter falls to less than holding current, causing the SCS to extinguish and the associated transistor 58 to resume its normally non-conductive state. That SCS extinguishment causes the anode gate of that SCS, and thus the junction joining resistor 56 and diode 57, to execute an abrupt rise in potential, and the resulting positive wavefront at that junction is applied through the input capacitor of the stepping-switch stage 59 to cause the firing of that stage's SCS and conductivity of that stage's transistor. The conductivity of the second-stage SCS and transistor will persist throughout the 50-millisecond second pulse and the succeeding 50-millisecond interval—but at the onset of the third pulse that SCS will be extinguished and that transistor rendered again non-conductive, and the third stage's SCS will be fired and its transistor rendered conductive, in correspondence to the action above described for the second stage. At the onset of the fourth pulse the third-stage SCS will be extinguished and the third-stage transistor rendered again non-conductive; since there remains in the illustrated stepping switch no further stage and thus no further SCS to be fired, the potential of conductor K will thereupon rise to near regulated positive supply potential, thus re-squelching the pulse generator.

It will thus be understood that for the first 100 milliseconds following the application of a positive wavefront to the cathode gate of SCS 51 the first-stage transistor 58 will be conductive and digit conductor 1 thus activated, for the second 100 milliseconds the transistor of the second stage 59 will be conductive and digit conductor 2 thus activated, and for the third 100 milliseconds the transistor of the third stage 60 will be conductive and digit conductor 3 thus activated.

This completes the basic description of both apparatus and operation of the means itself for successively activating the digit conductors in a predetermined sequence.

That means is subjected to control by any one of the address-conductor-activating means (e.g. switches 13, 23, 33, 43) and is actuated as an incident to activation of any of the channel conductors. For any one of the channels 12, 22, 32 and 42 this may be facilitated by the use of a common p-n-p transistor 65 whose emitter is connected to regulated positive supply potential, whose collector is connected to negative supply potential through two serially arranged resistors 66 and 67, and whose base is connected to the junction of the abovementioned two serially arranged resistors 63 and 64 connected between conductor J and regulated positive supply potential. The stepping-switch input capacitor 54 is connected to the junction of 66 and 67. Quiescently conductor J is at regulated positive supply potential, no current flows through resistors 63 and 64, and transistor 65 is non-conductive—but closure of any of the switches 13, 23, 33 and 43 to activate the respective address conductor, since it causes the potential of conductor J to drop suddenly and substantially, will result in an abruptly rising current through resistor 63 and the base-to-emitter path of transistor 65, rendering that transistor conductive and causing an abruptly rising current through resistors 66 and 67 and thus an abrupt voltage development across 67. From this voltage a positive wavefront, is applied through input capacitor 54 to trigger the stepping switch and thus to invoke the action of the means for successively activating the digital conductors in predetermined sequence. This successive activation of the *d* (e.g. three) digit conductors, occurring while one of the address conductors stands activated, will of course render successively conductive the *d* transistors which are under the control of that address conductor and those digit conductors.

For the illustrated embodiment wherein *s* is two, the collector circuit of each of the *cd* (twelve) transistors 111, 211 . . . 241, 341 may comprise a respective pair of branch paths; thus the collector circuit of transistor 111 may comprise the branch paths 113 and 114, that of the transistor 211 may comprise the branch paths 213 and 214, and so on. To avoid unwanted couplings between the elements (hereinafter described) to which these branch paths are connected, each branch path may serially include a respective de-coupling means in the form of a respective diode—each of those diodes being provided in FIGURE 1 with a number higher by two than that of the branch path in which it is included.

Attention may now be directed to the means which are provided to establish preselected interconnections of the terminals of the sets L0–L1–L2–L3–L4 and H0–H1–H2–H3 and thus to tune the two frequencies of the tone output of the tone-dialing oscillator TDO.

I have found that in order to effect this tuning it is highly desirable that these interconnections themselves be made through relatively short paths of low impedance. Accordingly for the interconnection of terminal L0 with terminals L1, L2, L3 and L4, I provide four local circuits respectively comprising the pairs of normally open contacts 161, 162, 163 and 164, and for the interconnection of terminal H0 with terminals H1, H2 and H3 I provide three local circuits respectively comprising the pairs of normally open contacts 165, 166 and 167. Each of these pairs of contacts forms part of a respective electromagnetic relay means having in FIGURE 1 in each instance a number less by ten than that of the respective pair of contacts. The coil of each of these relays forms a respective control means, to which the collector of one of the *cd* transistors may be connected, for closing the respective local circuit when that transistor is rendered conductive—and it will of course be noted that the local circuit, when closed, is one which is traversable by the alternating signal components which are inherently present in the oscillator's tuning circuits. A first terminal of the coil (which may if desired be shunted by a respective reversely poled diode for protective purposes) of each of these relay means may be connected to unregulated positive potential.

Electrically interposed between the collectors of the *cd* transistors (via the branch paths leading therefrom) on the one hand and the control means just mentioned on the other hand there are provided means for establishing preselected connections of those collectors to those control means. Such preselected-connection-establishing means may comprise seven conductors W1, W2, W3, W4, G1, G2 and G3 respectively leading from the relay coils 151 through 157; 4*cd* connection points each providing for the connection of one of the four conductors W1, W2, W3 and W4 with one of the *cd* branch paths 113, 213, 313, 123, 223, 323, 133, 233, 333, 143, 243 and 343; and 3*cd* connection points each providing for the connection of one of the three conductors G1, G2 and G3 with one of the *cd* branch paths 114, 214, 314, 124, 224, 324, 134, 234, 334, 144, 244 and 344. These 7*cd* connection points—together with another *cd* connection point by which a conductor M hereinafter described may be connected at will with any of the last-mentioned *cd* branch paths—may conveniently form a cross-bar arrangement, and are collectively designated as CB. In FIGURE 1 each connection point is illustrated as a circle intersected horizontally by the respective conductor and intersected vertically by the respective branch path; a white interior of any circle designates non-connection, and a black interior of any circle designates connection, at the point represented by that circle.

Individually each connection point, among those thus far described, may be identified by the designations, used hyphenatedly, of the conductor and of the branch path whose connection to each other it provides for—e.g. the top most lefthand one may be designated as "W1–113," the next-to-bottom most righthand one as "G3–344," and the bottom most righthand one as "M–344" (these designations, being readily determinable from the conductor and circuit designations appearing in FIGURE 1, having been themselves withheld from application in that figure to avoid obscurement of the illustration).

Subject to later qualification in connection with the description of function of the conductor M, it is contemplated that each of the *cd* odd-numbered branch paths will be connected to some one of the four conductors W1, W2, W3 and W4, and that each of the *cd* even-numbered branch paths will be connected to some one of the three conductors G1, G2 and G3. The selection of the W and G conductors to which there will be connected the circuits having designations whose second or middle symbol is "1" will be made in accordance with the telephone address desired to be tone-dialed upon activation of address conductor 10, that of the conductors to which there will be connected the circuits having designations whose second or middle symbol is "2" will be made in accordance with the telephone address desired to be tone-dialed upon activation of address conductor 20, and so on. Of any such telephone address the integer of which the first digit consists will control the W and G conductor selections for the branch paths having designations whose first symbol is "1," the interger of which the second digit consists will control the conductor selections for the branch paths having designations whose first symbol is "2," and so on.

This may be illustrated, in connection with the first and second address conductors or selector units, by assuming arbitrarily that upon at least momentary closure of the first-unit switch 13 it is desired to tone-dial the telephone address "569," and that upon at least momentary closure of the second-unit switch 23 it is desired to tone-dial the telephone address "790." For the first, it is readily determined from the tabulation early above that in tuning of the oscillator TDO appropriate to the integer "5" its terminals L0 and H0 should be connected to its terminals L2 and H2 respectively, in tuning appropriate to "6" L0 and H0 should be connected to L2 and H3 respectively, and in tuning appropriate to "9" L0 and H0 should be connected to L3 and H3 respectively; thus in the preselected-connection-establishing means CB branch path 113 would be connected to conductor W2 and branch path 114 to G2, branch path 213 would be connected to conductor W2 and branch path 214 to G3, and branch path 313 would be connected to W3 and circuit 314 to G3. For the second, in tuning of the oscillator appropriate to the integer "7" terminals L0 and H0 should be connected to terminals L3 and H1 respectively, in tuning appropriate to "9" L0 and H0 should be connected to L3 and H3 respectively, and in tuning appropriate to "0" L0 and H0 should be connected to L4 and H2 respectively; thus in the preselected-connection-establishing means CB branch path 123 would be connected to conductor W3 and branch path 124 to G1, branch path 223 would be connected to conductor W3 and 224 to G3, and branch path 323 would be connected to W4 and 324 and G2. Those connections—which constitute preselected connections of the collectors of transistors 111, 211, 311 and 121, 221 and 321 via the branch circuits to the appropriate ones of the control means 151 through 157—have been by way of example indicated in FIGURE 1.

Also schematically illustrated are the preselected connections appropriate to the tone-dialing, upon momentary closure of switch 33, of the telephone address "132."

It will now be understood that forthwith upon closure of switch 13 the tone-dialing oscillator TDO will be tuned automatically for three successive units of time (each unit typically of 100 milliseconds) to the respective three pairs of frequencies which in succession denote the preselected telephone address "569," that forthwith upon closure of switch 23 that oscillator will be tuned automatically for three successive units of time to the respective three pairs of frequencies which in succession denote the preselected telephone address "790," and that forthwith upon closure of switch 33 that oscillator will be tuned automatically for three successive units of time to the respective three pairs of frequencies which in succession denote the preselected telephone address "132." Thus in a broad sense there have already been disclosed both the structure and the operation of apparatus accomplishing a primary objective of the invention. It should be noted, however, that in the interest of providing a general understanding of the overall operation at this, the earliest practicable point herein, the foregoing description has omitted attention to several matters to which it is desirable to attend and detailed aspects of operation which it is desirable to understand, as well as certain optional features—all of which will now be dealt with.

For the apt functioning of the tone-dialing oscillator TDO its abovementioned contacts X must be closed—and, because conventional tone-dialing practice contemplates that the successive tone outputs from the oscillator will be each of approximately 50 milliseconds and will be separated each from its predecessor by an interval of approximately 50 milliseconds, this closure should be limited to a fraction only of each of the 100-millisecond units of time last mentioned above. To accomplish this limitation there are provided means, timed by the pulse generator in multiple with the stepping switch SS, for periodically activating and deactivating the oscillator. Such means may comprise a relay 88 (see FIGURE 3) of which the normally open contacts X of the oscillator TDO form a part and whose coil—connected for example across a pair of terminals 86 on the oscillator—may be supplied with current under the control of the pulse generator. Thus (see FIGURE 1) there may be provided an n-p-n transistor 85 whose emitter may be connected to negative supply potential and whose collector may be connected to unregulated positive supply potential via the terminals 86 so that, when flowing, the transistor's collector current will actuate the relay 88. The base of the transistor 85, which may be connected to negative supply potential through an appropriate resistor 84, may be connected to the output terminal 541 of the pulse generator, preferably through one or more voltage-dropping diodes 83. Thus basically the transistor 85 will be rendered conductive, and its collector current caused to flow, only during the 50-millisecond pulses throughout which terminal 541 is substantially positive; the oscillator TDO will accordingly be activated essentially at the onset, and will be deactivated essentially at the termination, of each of those pulses.

As has been pointed out by others in connection with a tone-dialing oscillator such as TDO, it is desirable that the tuning of the oscillator which is to prevail during any tone output thereof have already been established at the instant of activation of the oscillator. To accomplish this in the present apparatus there may be interposed between the pulse generator PG and the relay 88—preferably between terminal 541 and the diodes 83—a delay circuit, comprising for example a series resistor 81 and a shunt capacitor 82, which retards for a few milliseconds or so the operation of the relay 88 relative to the onset of the pulse at terminal 541.

In the early description of the tone-dialing oscillator there were disclosed (along with their functons) three pairs of contacts Z, V and U normally closed but opened during actual operation of the oscillator. These pairs of contacts may form parts of a relay 87 whose coil may be connected in parallel with that of relay 88, so that the opening and closing of these contact pairs may occur simultaneously with the closing and opening of the contact pair X of the latter relay. Another detail with respect to the contacts and relays is that across the paralleled coils of the relays there may be desirably be shunted a transient-absorbing diode 89, in accordance with well-known relay practice.

Attention may now be re-directed to the address selector CS and its operation. In the earlier description thereof there was not indicated the manner in which there might be accomplished the extingushment of any fired one of the SCS's therein at the conclusion of the operation of the stepping switch SS invoked by the firing of that SCS. For the performance of this extinguishing function there may be used an n-p-n transistor 90 whose emitter may be connected to negative supply potential and whose collector may be connected to the junction between the above-mentioned resistor 61 and diode 62. To the base of the transistor 90, which itself may be connected to negative supply potential through a resistor 93, there may be made a connection from the conductor K through a resistor 91 and one or more voltage-dropping diodes 92.

It is true that in the quiescent condition of the apparatus, when the conductor K has a substantial positive potential, the transistor 90 will be conductive and the path 61–62 thus disabled from supplying current to that conductor J, but as above noted the path 64–63 supplies sufficient current to that conductor to permit firing (even though not holding fired) of any one of the selector-unit SCS's—and the above-described dropping of potential of the conductor K forthwith upon that firing, since it renders the transistor 90 non-conductive, removes the disabling influence from the path 61–62. Obviously the disabling influence will be re-imposed by the transistor 90 when the conductor-K potential rises at the end of the stepping-switch sequence, with the intended effect of extinguishing any address-selector SCS which at that time is standing fired.

It may be noted that even though the selector-unit switch (e.g. 13, 23, 33, 43) associated with that SCS be still held closed this extinguishment will not be followed by a refiring of that SCS—for the associated capacitor (e.g. 15, 25, 35) will then not yet have been permitted to readjust its charge so as to be again capable of invoking the firing of that SCS.

There are instances in which it may be desired to program one of the channels for the tone-dialing of a telephone designation of less than *d* digits—for example of a single digit. FIGURE 1 by way of example illustrates connections of the branch paths 143 and 144 to the W and G conductors appropriate to the dialing of "7" as a first digit in response to momentary closure of switch 43; by omission of any connection to W and G conductors of any of the branch paths 243, 244, 343 and 344 it illustrates the absence of ensuing dialing of any second or third digit. In this case, however, there remains after the desired telephone address has been tone dialed 200 milliseconds of operation of the stepping switch, during which two further pulses will be generated at the terminal 541 and the oscillator TDO (in the absence of measures to the contrary) will be twice more activated and deactivated. During such further activations the oscillator would not produce any of its normal tone outputs, in view of the non-connection of branch paths 243, 244, 343 and 344 with any one of the W and G conductors—but it may generate, to the annoyance of the user (who may hear in his earpiece E) and may send out over the telephone line connected to terminals $N_1$ and $N_2$ (to the possible detriment of the functioning of remote apparatus) an arbitrarily high-pitched tone output. Positively to preclude this it is desirable to incorporate muting arrangements which disable the oscillator from generating any tone output during the further pulse or pulses remaining after the intended telephone address has been tone-dialed.

The muting arrangements may be incorporated in the preselected-connection-establishing means CB, in which for example there may be included an eighth conductor M arranged to be connectible at will to appropriate ones of the branch paths 113, 114, 213 . . . 344. In the particular circuitry disclosed herein it is sufficient, in order to provide for the muting of any digit of the telephone address commanded by any address conductor, to make the conductor M connectible either to any odd-numbered or to any even-numbered one of those branch paths; in FIGURE 1 it is shown as connectible to any even-numbered one.

In the illustrated apparatus whose action is controlled by the muting conductor M the disabling of the oscillator is effected by forestalling the closure of the oscillator's contacts X, for example by disabling of the relay 88 which would otherwise close them, and the connection of the conductor M to disable the oscillator during the activation of any one of the digit conductors will also disable the oscillator during any remainder, after such activation, of the usual sequence of digit-conductor (e.g. 1, 2, 3) activation.

For this purpose there may be employed an SCS 100, whose anode gate may be connected with its anode through a resistor 98, whose anode may be connected to regulated positive supply potential through a resistor 99, and whose cathode may be connected to negative supply potential. The cathode gate of SCS 100 may be connected to its cathode thru the parallel-resistor-capacitor combination 94. The anode gate may also be connected to regulated positive potential through serially arranged resistors 96 and 95, to the junction between which the conductor M may be connected.

If a connection has been made, as illustrated, between branch path 244 and conductor M, then when the stepping switch 55 renders transistor 241 conductive during the sequence invoked by the firing of SCS 47—i.e. at the completion of the first 100 milliseconds of that sequence, at which time the tone-dialing of the typical single-digit telephone address "7" has already been completed—the potential of the anode gate of SCS 100 will be lowered, and that SCS will be fired to perform the functions set forth at the beginning of the preceding paragraph.

The base circuit of the transistor 85, preferably at the junction between diodes 83 and resistor 81, may be clamped down to the anode of the SCS 100 through a diode 97, with the result that while the SCS 100 stands fired the transistor 85 will be rendered incapable of being made conductive, the relays 88 and 87 forestalled from operating, and the oscillator TDO thus kept disabled. This state of affairs, being initiated at the time last specified in the preceding paragraph, arises in ample time, in view of the delay circuit 81–82, to render wholly ineffective on the oscillator the second pulse of the sequence; since the SCS 100 will still remain fired, it renders the third pulse likewise ineffective—without requiring any connection between circuit 344 and conductor M.

The SCS 100 must of course be extingushed at the conclusion of the sequence—for which purpose advantage may be taken of the fact that at that conclusion the potential of the conductor K abruptly rises. Thus from that conductor to negative supply potential there may be connected a circuit serially comprising a diode 101 and two resistors 102 and 103, and to the junction between those resistors there may be connected the base of an n-p-n transistor 105 whose emitter may be connected to negative supply potential. The collector of the transistor 105 may be supplied with current from regulated positive potential through a resistor 107 and diode 106, and a capacitor 108 may be connected from the junction joining that resistor and that diode to the anode of the SCS 100.

During any sequence of operation of the stepping switch SS the conductor K will be at a low potential, the transistor 105 non-conductive, and the lefthand plate of capacitor 108 therefore at essentially regulated positive supply potential. But when at the conclusion of the sequence the potential of conductor K abruptly rises the lefthand plate of capacitor 108 will be abruptly brought down almost to negative supply potential through the diode 106 and the abruptly-dropping impedance of the collector-to-emitter path of transistor 105, and a strong negative pulse will be applied by the capacitor 108 to the anode of the SCS 100 to extinguish the latter.

Advantage may be taken of the transistor 105, which is of course quiescently conductive, to perform the function, mentioned early above as needing performance, of foreclosing any momentary conductivity of the transistor 80 at the onset of an initial pulse from the pulse-generator terminal 541. Thus across the serially connected resistors 102–103 there may be connected a capacitor 104 which, although it can charge essentially instantaneously through the diode 101 upon sudden rise of the potential of conductor K, will discharge relatively slowly (e.g. over a period of many milliseconds) upon sudden fall of that potential—with the result that the fall of potential of conductor K which occurs at the onset of the first pulse only of a sequence will occur before there has been time for the transistor 105 to become non-conductive. The base circuit of the transistor 80, preferably at the junction between capacitor 74 and diode 76, may be clamped down to the collector of transistor 105 through a diode 109, thus foreclosing any momentary conductivity of 80 at the onset of the first pulse.

In connection with the transistor 80 there will be noted in FIGURE 1 a circuit consisting of a capacitor 78 and a resistor 79 connected between its base and regulated positive supply potential. This has been found desirable to foreclose the possibility of transistor 80 being rendered momentarily conductive (and the potential of conductor K thus momentarily reduced) as an incident to connection of the apparatus to its source of D.C. potential (i.e. to change of the condition of the apparatus for wholly off to quiescent).

In telephone practice it is considered desirable to test any tone-dialing oscillator from time to time to verify the operativeness and pitch of its individual-frequency outputs. In thus testing the oscillator TDO it is necessary (i) that the relays 87 and 88 be temporarily kept operated, (ii) that during the testing of any low-frequency output no high-frequency output takes place and vice versa, and (iii) that a connection be established from terminal L0 or H0, as the case may be, to the individual L or H terminal appropriate to the individual-frequency output being tested.

To provide for the most convenient accomplishment of (iii) the terminals L0 and H0 may be connected to respective paths 413 and 414, in the preselected-connection-establishing means CB there may be provided four connection points at each of which the path 413 may be connected to a respective one of the W conductors, and in that means CB there may be provided three connection points at each of which the path 414 may be connected to one of the G conductors—it being understood that, (i) and (ii) being meanwhile appropriately accomplished, any one of such connections will elicit from the oscillator a respective one of its individual-frequency tone outputs. To accomplish (i) the upper-shown one of the terminals 86 may be temporarily connected to negative supply potential. To accomplish (ii) while testing any low-frequency component the path 414 may be connected to any two of the G conductors, thereby shorting some part of the tertiary B″; to accomplish (ii) while testing any high-frequency component the path 413 may be connected to any two of the W conductors, thereby shorting some part of the tertiary A‴.

Typical internal circuitry for the pulse generator PG is shown in FIGURE 2. It may be powered by the same supply as that used for the apparatus previously described; it may include a voltage divider formed by resistors 531 and 532 serially connected between regulated positive supply potential and negative supply potential, at the intermediate point 533 of which there may be made available a positive potential of a little over half of regulated positive supply potential.

The pulse generator may for example comprise two n-p-n transistors 501 and 502, the emitter of 501 being connected through a resistor 525, and that of 502 being connected directly, to negative supply potential; the collectors of 501 and 502 may be connected to regulated positive potential through respective resistors 509 and 510. The bases of transistors 501 and 502 may be connected to negative supply potential through respective resistors 505 and 506, which may be shunted by respective diodes 507 and 508 each poled to conduct toward the respective transistor base; those bases may also be connected to the intermediate-potential point 533 through respective circuits 503–519 and 504–520 each serially comprising a capacitor and a diode poled to conduct current toward that point. The junction joining capacitor 503 and diode 519 may be connected to regulated positive supply potential through the serial combination of a high-valued fixed resistor 511 and a lower-valued variable resistor 513, and that junction may also be connected to the collector of transistor 502 through a circuit comprising serially a resistor 515 and a diode 517 poled to conduct current toward that collector; the junction joining 504 and 520 may be connected to regulated positive supply potential through the serial combination of a high-valued fixed resistor 512 and a lower-valued variable resistor 514, and that junction may also be connected to the collector of transistor 501 through a circuit comprising serially a resistor 516 and a diode 518.

A one-stage amplifier is provided by a transistor 521 whose emitter is connected to negative supply potential, whose base is connected to the emitter of 501, and whose base-to-emitter path (rather than the resistor 525) is the principal avenue for the emitter current of 501. The collector of transistor 521 is connected to regulated positive supply potential through a resistor 529. The output terminals of the pulse generator and amplifier are constituted by 541 connected to the collector of 521, and 542 connected to negative supply potential. It will be understood that when the transistor 501 is conductive so likewise will be the transistor 521 and that the potential of terminal 541 will then be little above negative supply potential; quiescently it is this state of affairs which is maintained—by the application, already described, of a positive potential to the squelch terminal 543, which in turn is connected to the base of the transistor 501.

The conductivity of transistor 501 during the squelched condition places the collector of that transistor at near negative supply potential; the circuit 516–518 then maintains the righthand plate of capacitor 504 at a similar potential, while the resistor 506 maintains the lefthand plate of that capacitor at negative supply potential—i.e. that capacitor is essentially discharge. Transistor 502 will be non-conductive and its collector at essentially regulated positive supply potential; this renders the circuit 515–517 ineffective, and a steady small current will flow through resistors 511 and 513 and diode 519 to the point 533, placing the lefthand plate of capacitor 503 at substantially the intermediate potential of that point—i.e. that capacitor will stand charged. When the pulse generator is de-squelched by the removal of any substantial positive potential from terminal 543 the transistor 501 will forthwith assume a non-conductive condition, with effects as follows:

The assumption of non-conductive condition by transistor 501 renders ineffective the circuit 516–518, noted above to have been maintaining the righthand plate of capacitor 504 at near negative supply potential, accordingly permitting the charging of that capacitor (righthand plate positive) through and at a rate controlled by the resistors 512–514 and through the input path of transistor 502 which is then rendered conductive by the charging current. The conductivity of 502 drops its collector potential to near negative supply potential, invoking the rapid discharge of capacitor 503 through the circuit 515–517, transistor 502 and diode 507, after which the circuit 15–17 will maintain the lefthand plate of capacitor 503 at near negative supply potential and that capacitor essentially discharged. The conductivity of transistor 502 will continue until capacitor 504 has been charged to the intermediate potential of point 533, whereupon further charging is abruptly foreclosed by the diode 520 diverting the current flow from that capacitor to the point 533. The cessation of charging causes transistor 502 forthwith to assume a non-conductive condition.

The assumption of non-conductive condition by transistor 502 will invoke an action, including conduction by transistor 501, identical with that described in the preceding paragraph excepting for the interchange of lefthand and corresponding righthand components. At the conclusion of that action transistor 501 will again become non-conductive, reinvoking the action just as described in the preceding paragraph—and so on in a continuous alternation continuing until the pulse generator is re-squelched. Throughout the odd-numbered half-cycles of this alternation the amplifying transistor will be non-conductive and the terminal 541 thus at essentially regulated positive potential—that terminal being at near negative supply potential during the even-numbered half-cycles as well as quiescently.

It will be observed that in the squelched condition the components of the pulse generator are maintained in substantially the same condition as that in which they will be at the very end instant of any even-numbered half-cycle, with the results (i) that the first half-cycle following de-squelching will invariaby be one of conductivity of transistor 502, and (ii) that the duration of that first half-cycle will be essentially no different from that of any subsequent odd-numbered half-cycle. By adjustment of the variable resistors 514 and 513 there may be controlled within limits the durations of the odd and even-numbered half-cycles, respectively—i.e. the durations of the positive pulses at terminal 541 and of the inter-pulse intervals, respectively, each of which durations was above postulated to be approximately 50 milliseconds.

My disclosure has certain broad similarities to that of the co-pending Pecota application Serial No. 414,496 mentioned above. Among other contrasts to the disclosure of that application, however, I have removed the cross-bar board from the tuning circuits of the oscillator TDO, which are substantially "dry" circuits whose proper action is easily defeated by the slightest imperfection of connections, and have placed it instead in a position where it is traversed by the substantial D.C. collector currents of the transistors, the use of which is furthermore itself not disclosed in that application.

When the means (e.g. the selector units 12, 22, 32 and 42) which activate the address conductors 10, 20, 30 and 40 include triggerable silicon controlled devices (e.g. 17, 27, 37 and 47) it is frequently found that transients which may be present on the supply line—or on the conductors leading to and from the switches 13, 23, 33 and 43, particularly when (as shown) they are disposed in an array (e.g. SB) separate from the channel selector CS—may cause unintended triggering of those devices. Such transients may to a considerable extent be minimized by appropriate filtering, such as that provided by series resistor 5, shunt capacitor 6 and series inductance 7 appropriately inserted between the power supply and the common switch conductor J. I have, however, found it highly desirable also to provide inductive means, such as inductor 8 connected in the anode-current paths of the devices 17, 27, 37 and 47, for delaying the build-up of anode current in those devices in response to transients which are themselves sufficient to trigger one or more of those devices, so that the anode current is precluded from rising to hold-in value during the minute interval of persistence of the transient.

In compact review of the function of the apparatus, the closure (either momentary or longer) of the switch (e.g. 13 or 23) of one of the selector units (e.g. 12 or 22) will result forthwith in the automatic tone-dialing of the telephone address which in the cross-bar board CB has been preselected, or programmed, for that selector unit (e.g. the abovementioned address "569" in the case of selector unit 12, or "790" in the case of selector unit 22). This tone-dialing will be completed in approximately $(d-\frac{1}{2})\times 100$ milliseconds (e.g. in approximately 250 milliseconds in the illustrated case wherein $d$ equals three).

As has been brought out above, the illustration of the number $c$ of address conductors as four and of the number $d$ of digits as three is purely typical, and in practice other and usually larger numbers of address conductors or digits or both may and usually will be used. It is interesting to note that even though the number of digits be increased to seven, which is of course a very common choice, the tone-dialing of any full seven-digit telephone address will be completed in approximately 650 milliseconds—i.e. in less than two-thirds of one second, and this in response to the merely momentary closure of a single switch, and with no possibility of erroneous deviation from the sequence of integers which has been preselected, or programmed, for that switch.

It will of course be understood that the preselection, or programming, for any address conductor may be changed from time to time as the needs or desires of the user may dictate—such change requiring merely the alteration of the connections for that address conductor within the cross-bar board CB.

While I have illustrated and described my invention in terms of a particular embodiment thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In combination with an electrical system for the selective transmission of a number of respective-integer-representing signals, which system includes a plurality of variously interconnectible terminals, the interconnection of said terminals determining the transmitted signal: $d$ ($d$ being a plural integer) digit conductors; $c$ ($c$ being a plural integer) selectively activatable address conductors; $cd$ transistors each having a collector and a pair of control contacts consisting of base and emitter, said contacts of one type being connected with said digit conductors and said contacts of the other type being connected with said address conductors in matrix arrangement such that each combination of one digit conductor and one address conductor when contemporaneously activated renders conductive a rsepective one of said transistors; means, actuated as an incident to the activation of one of said address conductors, for successively activating the digit conductors in a predetermined sequence thereby successively to render conductive $d$ of said transistors; a plurality of normally open local circuits connected with said terminals, each of said circuits having associated therewith a respective control means, to which the collector of one of said transistors may be connected, for closing that circuit when that transistor is conductive thereby to effect a respective interconnection among said terminals; and means electrically interposed between the collectors of said transistors on the one hand and said control means on the other for establishing preselected connections of said collectors to said control means.

2. The subject matter claimed in claim 1 wherein said preselected-connection-establishing means is an electrical cross-bar board.

3. The subject matter claimed in claim 1 wherein said electrical system is a tone-dialing audio-frequency oscillator, wherein the interconnection of said terminals determines the oscillator's tone output, and wherein said local circuits are traversable by alternating signal components.

4. The subject matter claimed in claim 1 wherein said terminals comprise *s* (*s* being a plural integer) sets each of variously interconnectable terminals, and wherein said preselected-connection-establishing means provides for the establishment of connections from each collector to *s* of said control means.

5. The subject matter claimed in claim 4 wherein said last-mentioned connections serially include decoupling diodes.

6. The subject matter claimed in claim 1 further including means for selectively activating said *c* address conductors.

7. The subject matter claimed in claim 6 wherein said address-conductor-activating means comprises at least one silicon controlled triggerable device, further including inductive means connected in circuit with said device for delaying the build-up of anode current therein in response to transients.

No references cited.

KATHLEEN H. CLAFFY, *Primary Examiner.*

ALBIN H. GESS, *Assistant Examiner.*